(12) United States Patent
Oliver et al.

(10) Patent No.: US 9,360,497 B2
(45) Date of Patent: Jun. 7, 2016

(54) CONTROLLING SENSOR USE ON AN ELECTRONIC DEVICE

(75) Inventors: Robert George Oliver, Waterloo (CA); Adam Louis Parco, Kitchener (CA); Nathan Daniel Pozniak Buchanan, Waterloo (CA)

(73) Assignee: BlackBerry Limited, Waterloo (CA)

( * ) Notice: Subject to any disclaimer, the term of this patent is extended or adjusted under 35 U.S.C. 154(b) by 953 days.

(21) Appl. No.: 13/597,405

(22) Filed: Aug. 29, 2012

(65) Prior Publication Data

US 2014/0067306 A1      Mar. 6, 2014

(51) Int. Cl.
| | |
|---|---|
| *G01C 17/38* | (2006.01) |
| *G01C 25/00* | (2006.01) |
| *G01P 21/00* | (2006.01) |
| *G01C 19/00* | (2013.01) |

(52) U.S. Cl.
CPC .............. *G01P 21/00* (2013.01); *G01C 19/00* (2013.01); *G01C 25/005* (2013.01)

(58) Field of Classification Search
CPC ............................... G06F 3/0346; G01P 21/00
See application file for complete search history.

(56) References Cited

U.S. PATENT DOCUMENTS

| | | | |
|---|---|---|---|
| 2008/0234935 A1* | 9/2008 | Wolf | G01C 21/16 701/472 |
| 2009/0184849 A1 | 7/2009 | Nasiri et al. | |
| 2010/0033424 A1 | 2/2010 | Kabasawa et al. | |
| 2010/0218024 A1* | 8/2010 | Yamamoto | G06F 1/3203 713/324 |
| 2011/0239026 A1* | 9/2011 | Kulik | G01C 19/00 713/324 |
| 2011/0254760 A1 | 10/2011 | Lloyd et al. | |
| 2012/0004782 A1 | 1/2012 | Koskan et al. | |
| 2012/0162066 A1 | 6/2012 | Herz et al. | |

OTHER PUBLICATIONS

EPO, Extended European Search Report relating to application No. 12182154.0 dated Feb. 11, 2013.
CIPO, CA Office Action relating to Application No. 2,822,339, dated Jan. 27, 2015.
CIPO, CA Office Action relating to Application No. 2,822,339, dated Feb. 3, 2016.

* cited by examiner

*Primary Examiner* — Phuong Huynh
(74) *Attorney, Agent, or Firm* — Rowand LLP

(57) ABSTRACT

Described are methods and systems for controlling sensor use on an electronic device, the electronic device having a first sensor defining at least one first sensor axis, the method comprising: detecting a first sensor reading; determining an orientation of the electronic device; and, disabling the detection of the first sensor reading in respect an identified first sensor axis when the first sensor reading in respect of the identified first sensor axis is substantially not expected to change for at least a predetermined amount of time.

20 Claims, 4 Drawing Sheets

CONTROLLING SENSOR USE ON AN ELECTRONIC DEVICE

TECHNICAL FIELD

The present disclosure relates generally to electronic device orientation and, more particularly, to controlling sensor use on an electronic device.

BACKGROUND

An electronic device can include or be associated with one or more sensors, such as one or more gyroscopes, magnetometers and/or accelerometers. The sensors can be used to estimate or calculate the orientation of the electronic device.

A magnetometer is a device that can be used to measure the strength of magnetic fields. An accelerometer is a device that can be used to measure acceleration. A gyroscope is a device that can be used to measure rotation rate. Gyroscopes are sometimes included in electronic devices, such as handheld electronic devices, in order to provide information about the orientation of such electronic devices. Such orientation information allows the electronic device to know information about its own physical position. For example, the gyroscope may allow for recognition of movement within a three dimensional space. One or both of the magnetometer and accelerometer can be included in electronic devices in order to provide information about the orientation of such electronic devices. The orientation information provided by the magnetometer and accelerometer can be relative to the Earth's axes.

The electronic device may use such orientation information as an input signal. That is, the electronic device may be operated in a mode in which gyroscope measurements, accelerometer measurements and/or magnetometer measurements affect the operation of the electronic device.

BRIEF DESCRIPTION OF THE DRAWINGS

Like reference numerals are used in the drawings to denote like elements and features.

DETAILED DESCRIPTION OF EXAMPLE EMBODIMENTS

In one aspect, the present disclosure describes a method of controlling sensor use on an electronic device, the electronic device having a first sensor defining at least one first sensor axis, the first sensor for detecting first sensor readings in respect of the at least one first sensor axis, the method comprising: detecting a first sensor reading; calculating an orientation of the electronic device; determining that for an amount of time at least as long as a predetermined amount of time the calculation of the orientation of the electronic device does not use first sensor reading in respect of an identified first sensor axis; and, disabling the detection of the first sensor reading in respect of the identified first sensor axis.

In another aspect, the present disclosure describes an electronic device comprising: a memory; a first sensor for detecting first sensor readings in respect of at least one first sensor axis; and, a processor coupled to memory and the first sensor, the processor being configured to control sensor use on the electronic device by: detecting a first sensor reading; calculating an orientation of the electronic device; determining that for an amount of time at least as long as a predetermined amount of time the calculation of the orientation of the electronic device does not use first sensor reading in respect of an identified first sensor axis; and, disabling the detection of the first sensor reading in respect of the identified first sensor axis.

In another aspect, the present disclosure describes a computer readable storage medium comprising computer-executable instructions for controlling sensor use on an electronic device by: detecting a first sensor reading; calculating an orientation of the electronic device; determining that for an amount of time at least as long as a predetermined amount of time the calculation of the orientation of the electronic device does not use first sensor reading in respect of an identified first sensor axis; and, disabling the detection of the first sensor reading in respect of the identified first sensor axis.

Other aspects of the present disclosure will be described below.

Example Electronic Device

Electronic devices may sometimes benefit from knowledge about their own orientation. For example, electronic devices are sometimes configured to operate based on the orientation of the electronic device. That is, the orientation of the electronic device may act as an input to an application, system or process whose actions depend on the orientation of the electronic device. For example, a display screen on a display of the electronic device may depend on the orientation of the electronic device. By way of example, the display screen may toggle between landscape and portrait orientations based on the orientation of the electronic device.

Figure 1:
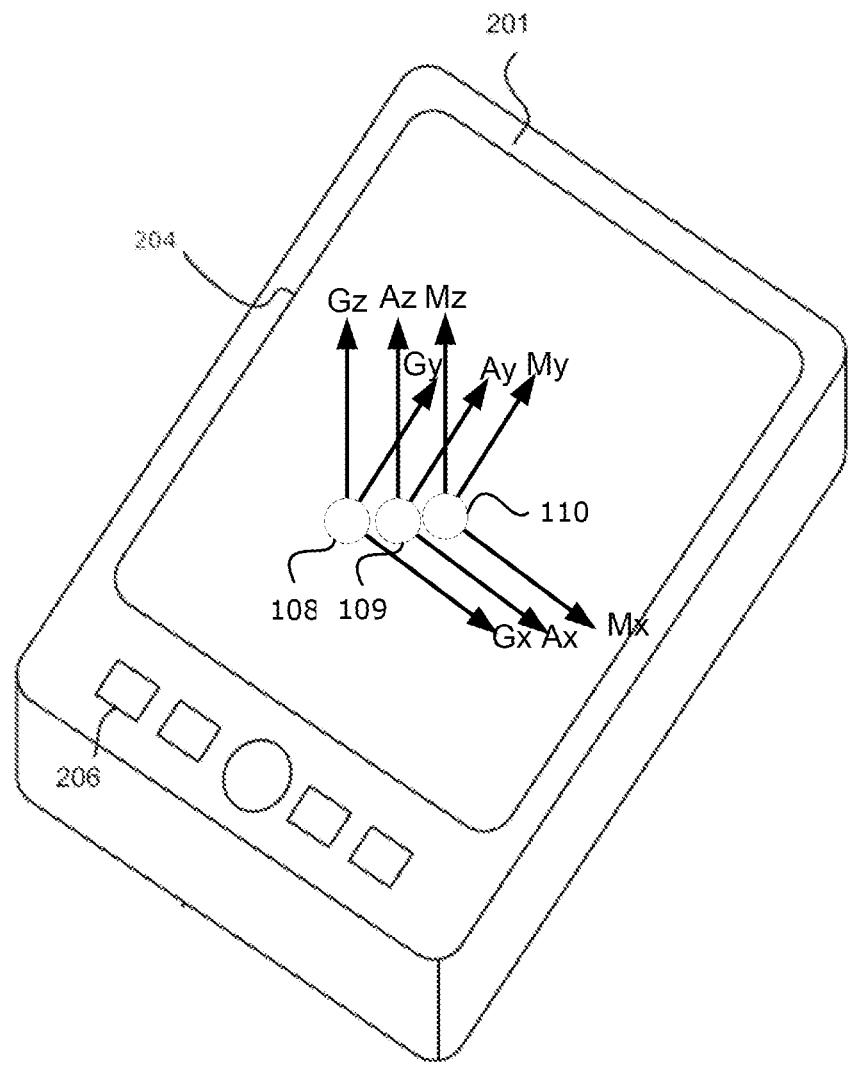
FIG. 1 is a perspective view of an electronic device in accordance with example embodiments of the present disclosure.

Referring first to FIG. 1, an example electronic device 201 is illustrated. In the embodiment illustrated, the electronic device 201 is a handheld mobile communication device. However, the electronic device 201 may take a variety of forms. By way of example, the electronic device may be a global positioning system (GPS) unit, an inertial navigation system (INS), a mobile communication device such as a mobile phone or smartphone, a tablet computer, a laptop computer, a wearable computer such as a watch, a camera, or an electronic device of another type.

In some embodiments, the electronic device 201 includes a display 204, such as a liquid crystal display (LCD), and an input interface 206, such as a keyboard or keypad or a navigation tool such as a clickable scroll wheel (also referred to as a track wheel or thumbwheel) or trackball. Other examples of an input interface 206 can include a touchpad or an optical input device. In some embodiments, the display 204 may be a touchscreen display which permits a user to provide input to the electronic device 201 by touching the display 204. That is, the display 204 may act as an input interface 206 to the electronic device 201, providing the electronic device 201 with an electronic signal generated in response to user contact with the touchscreen display.

The electronic device 201 includes one or more sensors, which may be used by the electronic device 201 to determine the orientation of the electronic device 201. In the example embodiment illustrated, the electronic device 201 includes a gyroscope 108, an accelerometer 109 and a magnetometer 110.

The gyroscope 108 measures rotational velocity of the gyroscope 108. In the embodiment illustrated, since the gyroscope 108 is integrated within the electronic device 201, the gyroscope 108 effectively measures rotational velocity of the electronic device 201. In the illustrated embodiment, the gyroscope 108 is illustrated using a circle, which is shown using a broken line to reflect the fact that the gyroscope 108 may be internally mounted within the electronic device 201. While the circular gyroscope 108 is useful for the purposes of illustration, the gyroscope 108 will typically take other forms. For example, the gyroscope 108 may have a standard electronic chip form factor.

The gyroscope 108 defines one or more sensing axis. In the embodiment illustrated, the gyroscope 108 includes three orthogonal sensing axes denoted Gx (to represent the gyroscope's x sensing axis), Gy (to represent the gyroscope's y sensing axis) and Gz (to represent the gyroscope's z sensing axis). Each sensing axis is orthogonal to the other sensing axes. For example, the x sensing axis (Gx) is orthogonal to the y and z sensing axes (Gy and Gz respectively), the y sensing axis (Gy) is orthogonal to the x and z sensing axes (Gx and Gz respectively) and the z sensing axis (Gz) is orthogonal to the x and y sensing axes (Gx and Gy respectively).

The gyroscope 108 may produce a gyroscope reading for each of the sensing axes, Gx, Gy, Gz. For example, a gyroscope reading $w_x$ may be produced by the gyroscope based on gyroscope measurements associated with the x sensing axis (such as a rotation about the x sensing axis), a gyroscope reading $w_y$ may be produced by the gyroscope based on gyroscope measurements associated with the y sensing axis (such as a rotation about the y sensing axis), and a gyroscope reading $w_z$ may be produced by the gyroscope based on gyroscope measurements associated with the z sensing axis (such as a rotation about the z sensing axis). These gyroscope readings collectively form the gyroscope output. That is, the gyroscope output is an electronic signal which is representative of the gyroscope readings $w_x$, $w_y$, $w_z$ for the sensing axes Gx, Gy, Gz of the gyroscope 108. The electronic signal may, for example, provide the gyroscope readings $w_x$, $w_y$, $w_z$ for the sensing axes Gx, Gy, Gz of the gyroscope 108 as measures of an amount of rotation per unit time about each sensing axis. For example, the gyroscope 108 may produce an output in terms of radians per second or degrees per second. The gyroscope output may, in some embodiments, be an analog output. In other embodiments, the gyroscope output may be digital. A gyroscope reading captured at a point in time may be referred to as a gyroscope sample. Such samples may be obtained, for example, at regular intervals. It is understood that a gyroscope reading can be obtained with respect to one axis (e.g. the Gx axis) independent of obtaining the gyroscope readings with respect to another axis (e.g. the Gy axis) or with respect to the remaining axes (e.g. the Gy axis and the Gz axis). Further, the intervals at which the readings for one axis (e.g. the Gx axis) are obtained can be independent of timing at which the readings for another axis (e.g. the Gy axis) or the remaining axes (e.g. the Gy axis and the Gz axis) are obtained.

The gyroscope output may separate the gyroscope readings for each sensing axis at a signal level or at an output interface level, or both. For example, in some embodiments, the gyroscope 108 may have a separate output interface (such as a separate pad or pin) associated with each sensing axis. Each output interface associated with a sensing axis may provide an output signal representing gyroscope readings for its associated sensing axis (thus separating the gyroscope readings for the sensing axes at an output interface level). In other example embodiments, a common output interface (such as a common pad or pin) may be associated with a plurality of sensing axes. That is, gyroscope readings for a plurality of sensing axes may be provided on a common output interface (such as a common pad or pin).

In some embodiments, the gyroscope 108 may be a digital gyroscope provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as an SPI (Serial Peripheral Interface) or I2C (Inter-Integrated Circuit) interface for connecting to a printed circuit board (PCB) of the electronic device 201.

The sensing axes Gx, Gy, Gz of the gyroscope 108 may be aligned with the form factor of the electronic device 201. For example, in the embodiment illustrated the axes are aligned such that, when the electronic device 201 is oriented on a flat surface, such as a table, the x and y sensing axes are parallel to the table and the z sensing axis is perpendicular to the table. It is contemplated that the sensing axes x, y, z may be aligned with different features of the electronic device 201 in other embodiments.

The electronic device 201 may also include an accelerometer 109. An accelerometer 109 is a device that generates an output signal in dependence on the acceleration of the accelerometer 109. That is, the accelerometer 109 produces an output which reflects the acceleration of the accelerometer. More particularly, the accelerometer 109 may generate an output which specifies the magnitude and/or direction of acceleration. In the embodiment illustrated, since the accelerometer 109 is integrated within the electronic device 201, the accelerometer 109 effectively measures the acceleration of the electronic device 201.

In the illustrated embodiment, the accelerometer 109 is illustrated using a circle, which is shown using a broken line to reflect the fact that the accelerometer 109 may be internally mounted within the electronic device 201. While the circular accelerometer 109 is useful for the purposes of illustration, the accelerometer 109 will typically take other forms. For example, the accelerometer 109 may have a standard electronic chip form factor.

In some embodiments, the accelerometer 109 may be a digital accelerometer provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as an SPI (Serial Peripheral Interface) or I2C (Inter-Integrated Circuit) interface for connecting to a printed circuit board (PCB) of the electronic device 201.

The accelerometer 109 defines one or more sensing axis. In the embodiment illustrated, the accelerometer 109 includes three orthogonal sensing axes denoted Ax (to represent the accelerometer's x sensing axis), Ay (to represent the accelerometer's y sensing axis) and Az (to represent the accelerometer's z sensing axis). Each sensing axis is orthogonal to the other sensing axes. For example, the x sensing axis (Ax) is orthogonal to the y and z sensing axes (Ay and Az respectively), the y sensing axis (Ay) is orthogonal to the x and z sensing axes (Ax and Az respectively) and the z sensing axis (Az) is orthogonal to the x and y sensing axes (Ax and Ay respectively).

The accelerometer 109 may produce an accelerometer reading for each of the sensing axes, Ax, Ay, Az. For example, an accelerometer reading $a_x$ may be produced by the accelerometer 109 based on accelerometer measurements associated with the x sensing axis (such as an acceleration along the x sensing axis), an accelerometer reading $a_y$ may be produced by the accelerometer 109 based on accelerometer measurements associated with the y sensing axis (such as an acceleration along the y sensing axis), and an accelerometer reading $a_z$ may be produced by the accelerometer 109 based on accelerometer measurements associated with the z sensing axis (such as an acceleration along the z sensing axis). These accelerometer readings collectively form the accelerometer output. That is, the accelerometer output is an electronic signal which is representative of the accelerometer readings $a_x$, $a_y$, $a_z$ for the sensing axes Ax, Ay, Az of the accelerometer 109. The accelerometer readings with respect to each of the three axes Ax, Ay, Az of the accelerometer 109 can be taken at intervals, which may be predetermined. The intervals for when accelerometer readings can be taken with respect to each of the three axes Ax, Ay, Az can each be independent of the others.

As shown in FIG. 1, the sensing axes Ax, Ay, Az of the accelerometer 109 may be aligned with the form factor of the electronic device 201. In the embodiment illustrated, the x and y sensing axes (Ax and Ay) are generally parallel to the front face of the electronic device and the z sensing axis (Az) is generally perpendicular to the front face of the electronic device. One or more of the sensing axes Ax, Ay, Az of the accelerometer 109 may be aligned with one or more of the sensing axes Gx, Gy, Gz of the gyroscope 108.

The electronic device 201 may also include a magnetometer 110. The magnetometer 110 (which may also be referred to as a digital compass) is a measuring instrument that is used to measure the strength and/or direction of magnetic fields. That is, the magnetometer 110 generates an electronic signal which reflects the direction and/or strength of a magnetic field in the vicinity of the magnetometer 110. Since the magnetometer 110 is mounted within the electronic device 201, the magnetometer 110 effectively reflects the direction and/or strength of a magnetic field acting on the electronic device 201.

In the illustrated embodiment, the magnetometer 110 is illustrated using a circle, which is shown using a broken line to reflect the fact that the magnetometer 110 may be internally mounted within the electronic device 201. While the circular magnetometer 110 is useful for the purposes of illustration, the magnetometer 110 will typically take other forms. For example, the magnetometer 110 may have a standard electronic chip form factor.

In some embodiments, the magnetometer 110 may be a digital magnetometer provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as an SPI (Serial Peripheral Interface) or I2C (Inter-Integrated Circuit) interface for connecting to a printed circuit board (PCB) of the electronic device 201.

The magnetometer 110 is, in at least some embodiments, a three axis magnetometer 110 that defines three sensing axes Mx, My, Mz. In the embodiment illustrated, the magnetometer 110 includes three orthogonal sensing axes denoted Mx (to represent the magnetometer's x sensing axis), My (to represent the magnetometer's y sensing axis) and Mz (to represent the magnetometer's z sensing axis). Each sensing axis is orthogonal to the other sensing axes. For example, the x sensing axis (Mx) is orthogonal to the y and z sensing axes (My and Mz respectively), the y sensing axis (My) is orthogonal to the x and z sensing axes (Mx and Mz respectively) and the z sensing axis (Mz) is orthogonal to the x and y sensing axes (Mx and My respectively).

The magnetometer 110 may produce a magnetometer reading for each of the sensing axes, Mx, My, Mz. For example, a magnetometer reading $m_x$ may be produced by the magnetometer 110 based on magnetometer measurements associated with the x sensing axis (such as a magnetic field along the x sensing axis), a magnetometer reading $m_y$ may be produced by the magnetometer 110 based on magnetometer measurements associated with the y sensing axis (such as a magnetic field along the y sensing axis), and a magnetometer reading $m_z$ may be produced by the magnetometer 110 based on magnetometer measurements associated with the z sensing axis (such as a magnetic field along the z sensing axis). These magnetometer readings collectively form the magnetometer output. That is, the magnetometer output is an electronic signal which is representative of the magnetometer readings $m_x$, $m_y$, $m_z$ for the sensing axes Mx, My, Mz of the magnetometer 110. The magnetometer readings with respect to each of the three axes Mx, My, Mz of the magnetometer 110 can be taken at intervals, which may be predetermined. The intervals for when magnetometer readings can be taken with respect to each of the three axes Mx, My, Mz can each be independent of the others.

As shown in FIG. 1, the sensing axes Mx, My, Mz of the magnetometer 110 may be aligned with the form factor of the electronic device 201. In the embodiment illustrated, the x and y sensing axes (Mx and My) are generally parallel to the front face of the electronic device 201 and the z sensing axis (Mz) is generally perpendicular to the front face of the electronic device 201. One or more of the sensing axes Mx, My, Mz of the magnetometer 110 may be aligned with one or more of the sensing axes Gx, Gy, Gz of the gyroscope 108 and/or one or more sensing axes Ax, Ay, Az of the accelerometer 109.

While FIG. 1 illustrates three separate sensors (e.g. a gyroscope 108, an accelerometer 109, and a magnetometer 110), in some embodiments, two or more of these sensors may be provided in a common packaging, such as a common electronic chip. For example, in some embodiments, a single electronic chip may include both an accelerometer 109 and a magnetometer 110.

Figure 2:
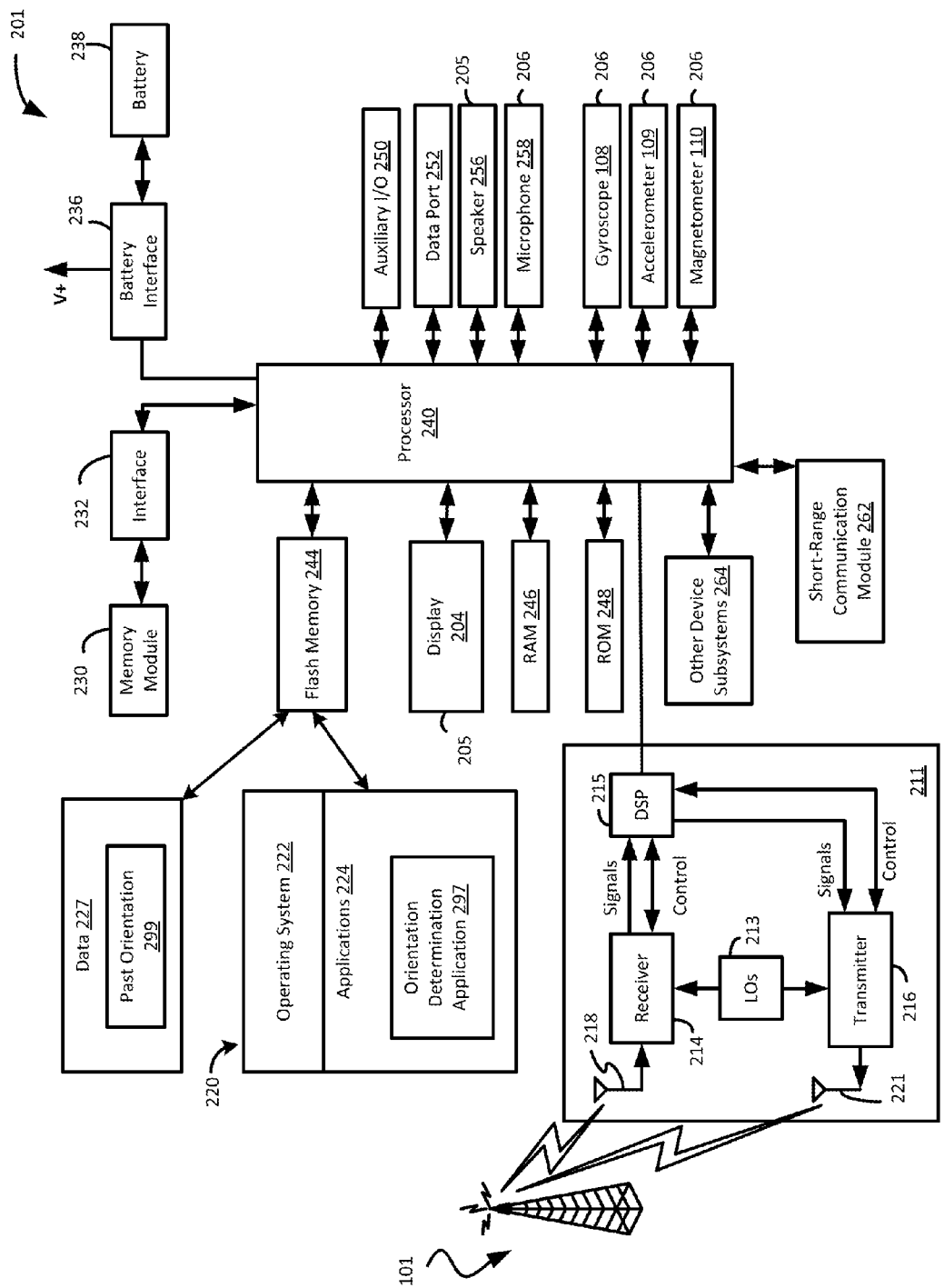
FIG. 2 is a block diagram of example components of an electronic device in accordance with example embodiments of the present disclosure.

Referring now to FIG. 2, a block diagram of an example electronic device 201 is illustrated. The electronic device 201 of FIG. 2 may include a housing which houses components of the electronic device 201. Internal components of the electronic device 201 may be constructed on a printed circuit board (PCB). The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, one or more cameras, a gyroscope 108, an accelerometer 109, a magnetometer 110 and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204 (which may be a liquid crystal display (LCD)), one or more speakers 256, or other output interfaces), a short range communication module 262, and other device subsystems generally designated as 264. Some of the subsystems shown in FIG. 2 perform communication-related functions, whereas other subsystems may provide "resident" or on-device functions.

The electronic device 201 may include a touchscreen display in some example embodiments. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the electronic device 201 and a single antenna may be shared by both receiver 214 and transmitter 216, as is known in the art. The particular design of the wireless communication subsystem 211 depends on the wireless network 101 in which the electronic device 201 is intended to operate.

The electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some example embodiments, the auxiliary input/output (I/O) subsystems 250 may include an external communication link or interface, for example, an Ethernet connection. The electronic device 201 may include other wireless communication interfaces for communicating with other types of wireless networks; for example, a wireless network such as an orthogonal frequency division multiplexed (OFDM) network.

In some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network type. The memory module 230 may be inserted in or connected to the memory module interface 232 of the electronic device 201.

The electronic device 201 may store data 227 in an erasable persistent memory, which in one example embodiment is the flash memory 244. In various example embodiments, the data 227 may include service data having information required by the electronic device 201 to establish and maintain communication with the wireless network 101. The data 227 may also include user application data such as email messages, address book and contact information, calendar and schedule information, notepad documents, images, and other commonly stored user information stored on the electronic device 201 by its user, and other data.

The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the electronic device 201 memory.

The data port 252 may be used for synchronization with a user's host computer system. The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer for processing.

The electronic device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short range communication module 262 provides for communication between the electronic device 201 and different systems or devices, which need not necessarily be similar devices. For example, the short range communication module 262 may include an infrared device and associated circuits and components, or a wireless bus protocol compliant communication mechanism such as a Bluetooth® communication module to provide for communication with similarly-enabled systems and devices.

The electronic device 201 includes a gyroscope 108 which is configured to sense rotation of the electronic device 201. The gyroscope 108 may, in at least some embodiments, be a three-axis gyroscope of the type described above with reference to FIG. 1. The electronic device 201 also includes an accelerometer 109 and/or a magnetometer 110 which may be of the types described above with reference to FIG. 1.

A predetermined set of applications that control basic device operations, including data and possibly voice communication applications may be installed on the electronic device 201 during or after manufacture. Additional applications and/or upgrades to an operating system 222 or software applications 224 may also be loaded onto the electronic device 201 through the wireless network 101, the auxiliary I/O subsystem 250, the data port 252, the short range communication module 262, or other suitable device subsystems 264. The downloaded programs or code modules may be permanently installed; for example, written into the program memory (e.g. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or webpage download will be processed by the communication subsystem 211 and input to the processor 240 for further processing. For example, a downloaded webpage may be further processed by a web browser or an email message may be processed by the email messaging application and output to the display 204. A user of the electronic device 201 may also compose data items, such as email messages; for example, using an input interface 206 in conjunction with the display 204. These composed items may be transmitted through the communication subsystem 211 over the wireless network 101.

In the voice communication mode, the electronic device 201 provides telephony functions and may operate as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output may be accomplished primarily through the speaker 256, the display 204 may also be used to provide an indication of the identity of a calling party, duration of a voice call, or other voice call related information.

The processor 240 operates under stored program control and executes software modules 220 stored in memory such as persistent memory; for example, in the flash memory 244. As illustrated in FIG. 2, the software modules 220 may include operating system software 222 and one or more additional applications 224 or modules such as, for example, an orientation determination application 297.

In the example embodiment of FIG. 2, the orientation determination application 297 is illustrated as being implemented as a stand-alone application 224. However, in other example embodiments, the orientation determination application 297 could be provided by another application or module such as, for example, the operating system software 222. Furthermore, while the orientation determination application 297 is illustrated with a single block, the functions or features provided by the orientation determination application 297 could, in at least some embodiments, be divided up and implemented by a plurality of applications and/or modules.

Further, while, in the example embodiment of FIG. 2, the orientation determination application 297 is illustrated as being associated with the main processor 240 of the electronic device 201, in other embodiments, the orientation determination application 297 could be associated with another processor, or group of processors. For example, in some embodiments, the gyroscope 108, accelerometer 109 and/or magnetometer 110 may include or be connected to a secondary processor. The secondary processor may provide a narrow set of functions or features and may be used to offload some processing from the main processor 240. For example, in some embodiments, the secondary processor is a sensor-specific processor which is configured to provide sensor-related functions such as those provided by the orientation determination application 297. For example, the secondary processor may be configured to determine an orientation of the electronic device. The orientation determination application 297 is, in at least some embodiments, configured to determine an orientation for the electronic device 201.

The electronic device 201 may include a range of additional software applications 224, including, for example, a notepad application, voice communication (i.e. telephony) application, mapping application, a media player application, or any combination thereof. Each of the software applications 224 may include layout information defining the placement of particular fields and graphic elements (e.g. text fields, input fields, icons, etc.) in the user interface (i.e. the display 204) according to the application.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

Calculating Orientation

The data 227 may include a past orientation 299. The past orientation 299 may be an orientation estimate for the electronic device 201 which was previously determined. The past orientation 299 may be used, for example, to allow the electronic device 201 to determine an orientation of the electronic device 201 from the gyroscope readings obtained from the gyroscope 108. That is, the past orientation 299 may serve as a reference point for determining orientation from gyroscope readings. Gyroscope readings may not, taken alone, provide the electronic device 201 with enough information to determine the electronic device's orientation. However, gyroscope readings, when coupled with a reference point (such as the past orientation 299) may provide the electronic device 201 with information which allows the electronic device 201 to determine the orientation.

In one or more embodiments, the reference point can be calculated using readings from the magnetometer and accelerometer. The gyroscope readings can then be coupled with the reference point to determine the orientation of the electronic device 201. For example, the magnetometer 110 and the accelerometer 109 can be used to provide orientation information with respect to the earth's axes by locating the direction and/or intensity of the magnetic field of the earth (e.g. the North Pole) and the gravitational pull of the earth, respectively. Thus, if there is no interference with the readings, the magnetometer and accelerometer readings together can provide a three dimensional absolute orientation of the electronic device 201. The measured spatial orientation is then used as the reference point (or past orientation 299). The gyroscope 108 readings provide a rate of rotation of the electronic device 201 around one or more of the gyroscope axes Gx, Gy, Gz. The electronic device 201 (or the processor 240 associated with the electronic device 201) can then combine the gyroscope readings, providing a relative rotation measurement, with the reference orientation provided by the accelerometer readings and magnetometer readings and calculate a current orientation of the electronic device 201. The reference point is an example of a past orientation 299.

Because the past orientation 299 may be current (i.e. representative of a current orientation) for only a short period of time, the past orientation 299 can be stored in a temporary storage. For example, the past orientation 299 may be stored in an area of memory which is reserved for storing transient data. Each time a reading is obtained for one or more sensor (e.g. accelerometer, magnetometer and/or gyroscope) for one or more axis with respect to that sensor, the orientation of the electronic device 201 may be calculated and stored as the past orientation 299. For example, if a reading is obtained with respect to the x-axis of the gyroscope (indicating rotation of the electronic device 201 about the gyroscope's x-axis) then the orientation will be calculated as being the past orientation 299 that has been rotated by an amount equal to the obtained rotation about the x-axis of the gyroscope 108. This new orientation calculation can then be stored as the past orientation 299. By way of further example, the absolute orientation of the electronic device 201 can be calculated using readings obtained from the accelerometer 109 and/or magnetometer 110. This absolute orientation can then be stored as the past orientation 299.

Controlling Sensor Readings

Figure 3:
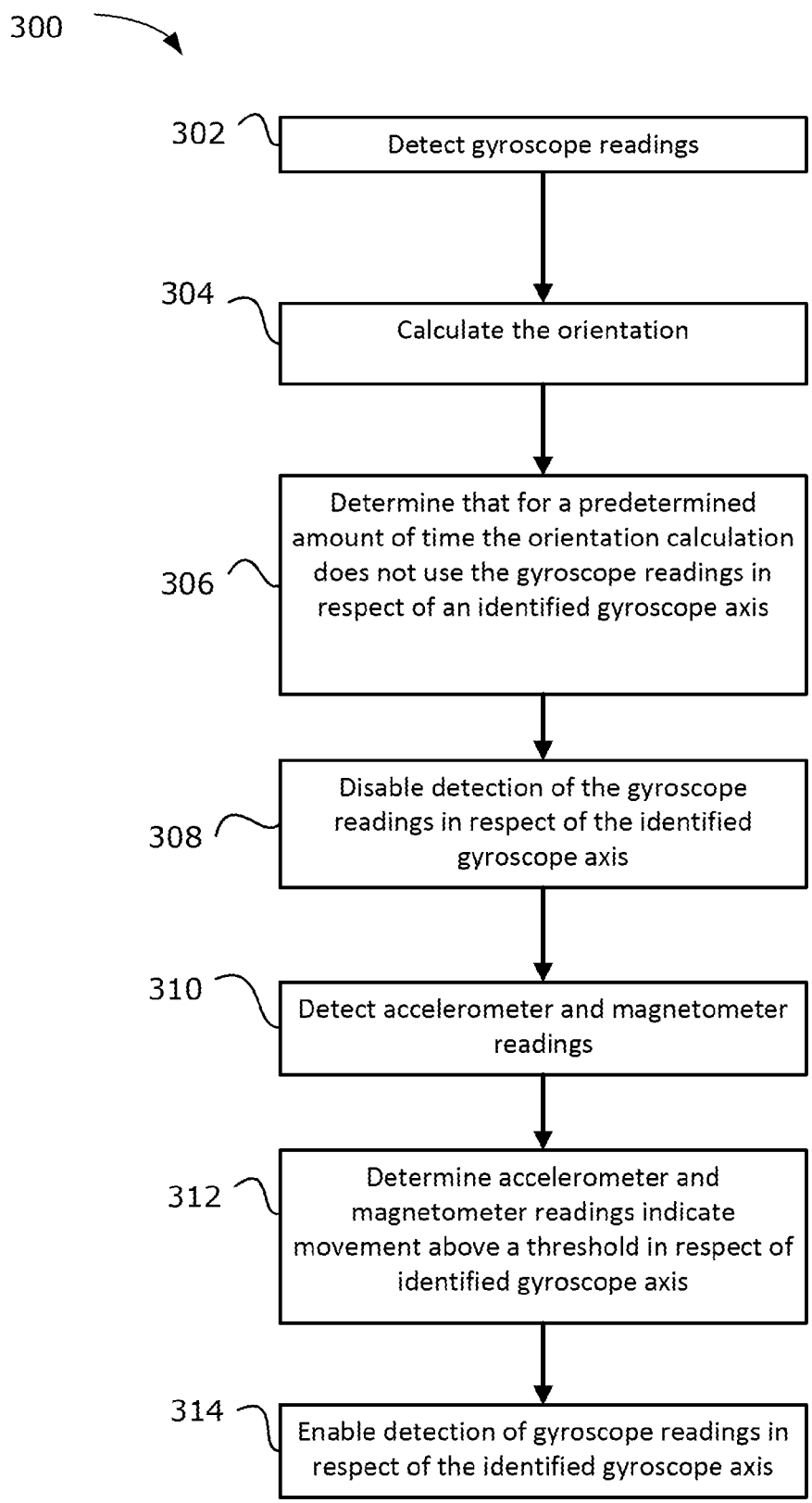
FIG. 3 is a flowchart of an example method of controlling sensor readings in accordance with example embodiments of the present disclosure; and, FIG. 4 is a flowchart of an example method of controlling sensor readings in accordance with example embodiments of the present disclosure.

In the following description, reference will be made to FIG. 3 which illustrates, in flowchart form, a method 300 of controlling sensor readings. The method 300 may include features which may be provided by an electronic device 201, such as the electronic device 201 of FIGS. 1 and 2. For example, one or more applications or modules associated with an electronic device 201, such as the orientation determination application 297 (FIG. 2), may contain processor readable instructions for causing a processor associated with the electronic device 201 to perform the method 300 of FIG. 3. That is, in at least some example embodiments, the electronic device 201 may be configured to perform the method 300. For example, the method 300 may be implemented by a processor 240 (FIG. 2) of an electronic device 201 (FIG. 2).

In at least some embodiments, one or more of the functions or features of the method 300 may be performed, in whole or in part, by another system, software application, module, component or device apart from those specifically listed above. For example, in some embodiments, the method 300 may be performed by a processor associated with the gyroscope 108, the accelerometer 109 and/or the magnetometer 110. That is, in at least some embodiments, the method 300 or a portion thereof may be performed by a processor other than the main processor of the electronic device 201. For example, a separate processor may be configured for the specific purpose of performing the method 300 or a portion thereof.

At 302, a gyroscope reading is detected. In an embodiment, the gyroscope may detect rotations about one or more of its three axes. For example, a gyroscope reading $w_x$ may be obtained from the gyroscope 108 based on gyroscope measurements associated with the x sensing axis (such as a rotation about the x sensing axis). By way of further, alternative examples, a gyroscope reading $w_y$ may be obtained from the gyroscope 108 based on gyroscope measurements associated with the y sensing axis (such as a rotation about the y sensing axis), and a gyroscope reading $w_z$ may be obtained from the gyroscope 108 based on gyroscope measurements associated with the z sensing axis (such as a rotation about the z sensing axis). Detecting a gyroscope reading in respect of an axis of the gyroscope 108 can comprise collecting samples of the rotational velocity measured about that axis.

At 304, the orientation of the electronic device 201 is calculated. For example, the orientation of the electronic device 201 can be calculated using the detected gyroscope reading. By way of further example, the electronic device 201 may have stored a reference point or past orientation 299 in memory. The past orientation 299 is coupled with the gyroscope reading to provide a new calculation describing the orientation of the electronic device 201. The rate of rotation provided by the gyroscope reading can be used to provide a corresponding rotation to the past orientation 299 of the electronic device 201. The new orientation can be stored in memory on the electronic device 201 (e.g. in place of the past orientation 299).

In accordance with one or more embodiments, the operation of calculating the orientation of the electronic device 201 can be performed at periodic or predetermined time intervals. Associated with each time interval readings can be taken for one or more of the sensors in respect of one or more of the sensor axes. It is recognized that the readings of one sensor may be taken at different periodic time intervals than the readings from another sensor. The calculation of the orientation of the electronic device 201 can be based on these readings and can also be based on the past orientation 299 stored in memory. For example, the orientation of the electronic device 201 can be calculated after and based on each instance of obtaining a reading from one or more sensor in respect of one or more axis of that sensor.

Readings from one or more sensor in respect of one or more axis may indicate that no movement is detected in respect of such one or more axis. The term "no movement" can be taken to mean movement that is below a predetermined threshold. For example, one or more sensor may always be outputting (and/or detecting) a minimal amount of signal in respect of each axis due to environmental interference and/or noise. A reading from one or more sensor in respect of one or more axis that indicates no movement will have no effect on the calculation of the orientation of the electronic device 201. For example, the electronic device 201 may be programmed (e.g. through instructions stored on memory) to ignore readings that are below a certain value in respect of certain axes of certain sensors. A "no movement" reading from a sensor in respect of an axis of that sensor can still require collection of samples by the sensor in respect of the axis.

At 306, it is determined that for an amount of time at least as long as a predetermined amount of time the calculation of the orientation of the electronic device 201 does not use a gyroscope reading in respect of an identified gyroscope axis. In other words, the calculation of the orientation of the electronic device 201 does not use gyroscope readings in respect of an identified gyroscope axis for a certain amount of time which is at least as long as a predetermined amount of time. One or more orientation calculations can be performed during the amount of time that is at least as long as the predetermined amount of time. Similarly, the electronic device 201 can obtain one or more readings from one or more axes of one or more sensors (including the identified gyroscope axis) during the amount of time that is at least as long as the predetermined amount of time. In accordance with one or more embodiments the predetermined amount of time is in the range of 1 to 2 second. In one or more embodiments, it can be determined that for an amount of time that is at least as long as a predetermined amount of time the calculation of the orientation of the electronic device 201 does not use a gyroscope reading in respect of more than one identified gyroscope axes.

In one or more embodiments, the predetermined amount of time may instead be an adaptive amount of time. For example, the adaptive amount of time may depend on the amount of movement that has been measured at one or more sensors of the electronic device 201 during a previous time period. The adaptive amount of time may increase when the amount of movement measured during a previous time period increases. For example, the electronic device 201 may move from a stationary state to a state in which it is in transit (e.g. being carried in a pocket or bag) in which case the adaptive amount of time will increase.

Different predetermined amounts of time and or adaptive amounts of time may be associated with each separate sensing axis of each separate sensor.

In one or more embodiments, the predetermined amount of time or the adaptive amount of time may also depend on the processing power and/or the amount of time to disable and/or enable a sensing axis. For example, the predetermined amount of time may be greater for a specific sensing axis of a specific sensor (as compared to a second sensing axis of a sensor) if the specific sensing axis uses more time to become enabled than a second sensing axis.

In accordance with one or more embodiments, the readings from the gyroscope in respect of its x-axis indicate that there is no movement of the gyroscope 108 (or the electronic device 201) in respect of the gyroscope's x-axis Gx for an amount of time at least as long as the predetermined amount of time. During this amount of time, the electronic device 201 (e.g. the orientation determination application 297) will not have used the reading in respect of the gyroscope's x-axis Gx in the calculation of the orientation of the electronic device 201. During this time readings from one or more of the gyroscope's y-axis Gy and z-axis Gz may be used in the calculation of the orientation of the electronic device 201. By way of clarification, when no gyroscope reading in respect of the gyroscope's x-axis Gx is used to calculate the orientation of the electronic device 201, then the electronic device 201 is considering that it is not rotating about the gyroscope's x-axis Gx.

At 308, the electronic device 201 (e.g. the processor 240 coupled with the electronic device 201) disables detection of the gyroscope readings in respect of the identified gyroscope axis. In accordance with an exemplary embodiment, disabling the detection of the gyroscope readings about the identified gyroscope axis is accomplished by ceasing to obtain data samples of the gyroscope's measurements in respect of the identified sensing axis. For example, if at 306 it is determined that for a predetermined amount of time the orientation calculation does not use the gyroscope readings in respect of the gyroscope's x-axis Gx then the electronic device 201 would stop obtaining or collecting samples in respect of the gyroscope's x-axis Gx. Following this example, the readings from the gyroscope's y-axis Gy and z-axis Gz can still be enabled so that the electronic device 201 would still be collecting or obtaining samples from the gyroscope in respect of the gyroscope's y-axis Gy and/or z-axis Gz. In one or more further embodiments, disabling detection of the gyroscope readings in respect of the identified gyroscope axis can mean collecting fewer samples (or collecting samples at a decreased rate) for the gyroscope in respect of the identified gyroscope axis.

At 310, the accelerometer and magnetometer readings are collected for the electronic device 201. In accordance with an exemplary embodiment, the accelerometer and magnetometer readings are periodically collected at predetermined time intervals. For example, the accelerometer and magnetometer readings are periodically collected in order to provide a corrected reference point (or past orientation 299) from which the orientation of the electronic device 201 can be calculated. Periodically determining a corrected reference point can be performed in order to limit the drift caused by errors in the gyroscope readings, for example.

At 312, it is determined that the accelerometer and magnetometer readings taken at 310 indicate movement above a threshold of the electronic device 201 in respect of the identified sensing axis of the gyroscope. In other words, the accelerometer 109 and magnetometer 110 indicate that there is movement that would have been detected by the axis of the gyroscope 108 that has been disabled. For example, the accelerometer and/or magnetometer readings can provide enough information to calculate a three-dimensional orientation of the electronic device 201. The calculated three-dimensional orientation of the electronic device 201 can be compared to the past orientation 299 in order to determine the amount and angle of rotation about the identified sensing axis of the gyroscope 108 in the time since the calculation of the past orientation 299. It is understood that the past orientation 299 can be the most recently calculated orientation or can be the orientation calculated at the time when the detection of the gyroscope readings in respect of the identified gyroscope axis was disabled 308. The accelerometer readings and magnetometer readings taken at 310 may be used only to detect whether there is or has been any rotation of the electronic device 201 about the identified sensing axis of the gyroscope (in other words, in such an embodiment the accelerometer readings and magnetometer readings are not used to update the past orientation 299). Further, in certain configurations of the sensors (e.g. the accelerometer 109, magnetometer 110 and gyroscope 108) readings in respect of only a subset of axes of the accelerometer 109 and/or magnetometer 110 may be used to determine that there is movement above a threshold of the electronic device 201 in respect of the identified sensing axis of the gyroscope 108.

At 314, the detection of the gyroscope readings in respect of the identified sensing axis is enabled. In one example, enablement of the identified sensing axis of the gyroscope 108 is performed after it is determined (at 312) that the accelerometer 109 and/or magnetometer 110 readings indicate movement above a threshold in respect of the identified gyroscope axis. In accordance with an exemplary embodiment, enablement of the detection of the gyroscope readings in respect of the identified sensing axis can comprise obtaining or collecting (e.g. periodically) samples from the gyroscope 108 in respect of the identified sensing axis.

The method 300 may be repeated. That is, further iterations of the method 300 may be performed. Portions of the method 300 may also be repeated. For example, after the identified sensing axis of the gyroscope 108 is disabled (at 308), iterations of detecting accelerometer and magnetometer readings (at 310) and determining whether there is movement above the threshold in respect of the identified sensing axis (at 312) can be performed at predetermined intervals. Each predetermined interval can last for a predetermined amount of time.

While the method 300 is in operation, the electronic device 201 can be using readings from the sensors (e.g. the accelerometer, magnetometer and/or gyroscope) in respect of the axes that are enabled in order to calculate the orientation of the electronic device 201.

The gyroscope reading is an example of a first sensor reading and the accelerometer reading and magnetometer reading can be considered the second sensor reading and third sensor reading respectively, in respect to method 300. In one or more alternative embodiments, the accelerometer reading may be the first sensor reading and the gyroscope reading and magnetometer reading may be the second and third sensor readings. In one or more alternative embodiments, the magnetometer reading may be the first sensor reading and the gyroscope reading and accelerometer reading may be the second and third sensor readings. For example, in one or more alternative examples, it is a sensing axis of the accelerometer or magnetometer that is disabled, as described with reference to the exemplary embodiment shown in FIG. 4. Accordingly, the sensor (e.g. gyroscope, accelerometer, magnetometer) for which an identified sensing axis is disabled can be referred to as the first sensor.

Figure 4:
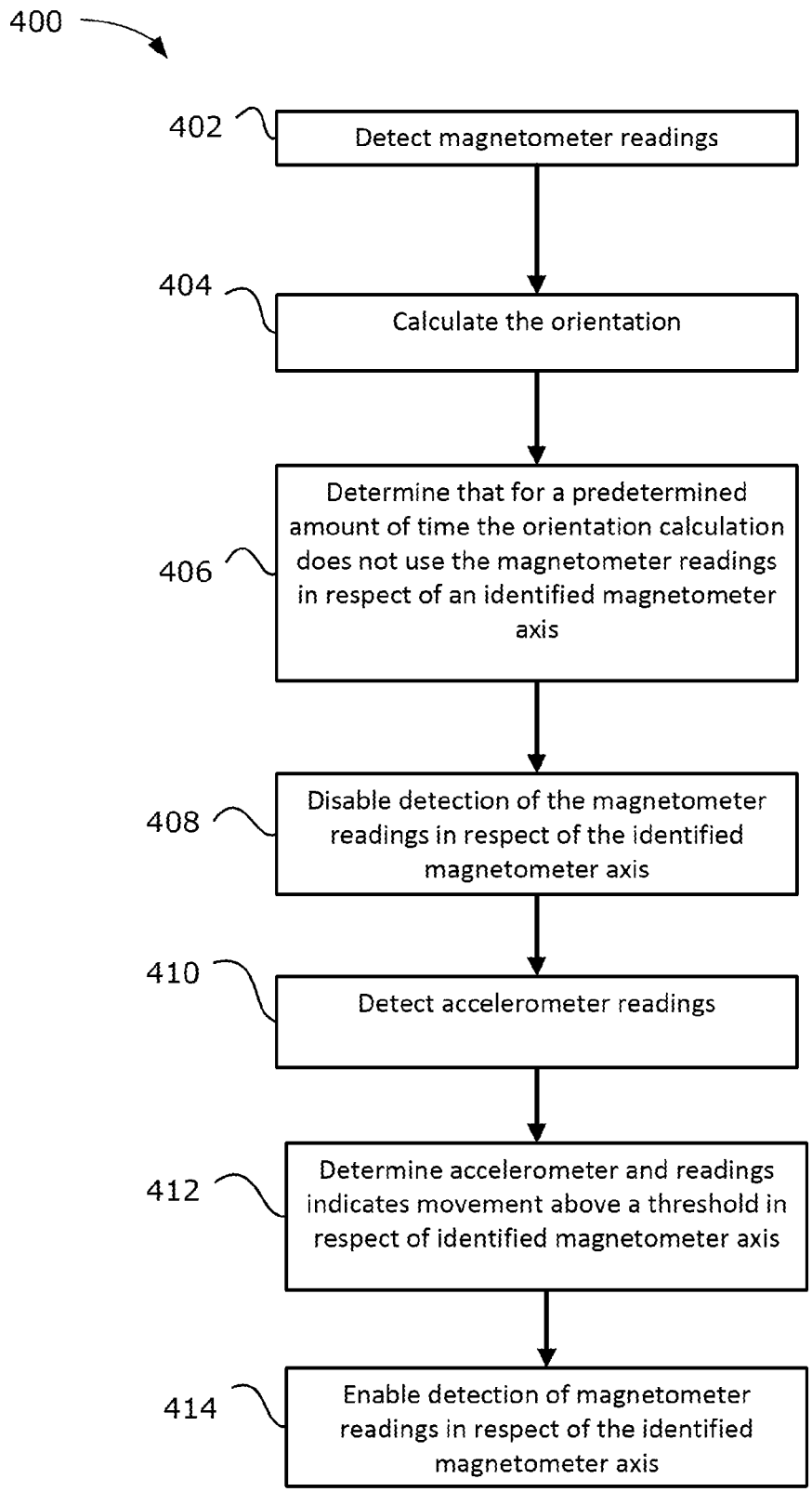

FIG. 4 is a flowchart showing a further example embodiment of controlling the use of a sensor associated with an electronic device 201.

At 402 a magnetometer reading is detected. For example, the magnetometer reading can be detected at one or more of the magnetometer sensing axes. The magnetometer readings can be detected in tandem with one or more accelerometer readings with respect to one or more accelerometer sensing axes. The magnetometer readings and/or the accelerometer readings can be detected at predetermined time intervals.

In at least some embodiments, magnetometer readings for each axis of the magnetometer 110 may be obtained at 402. For example, a magnetometer reading $m_x$ may be obtained from the magnetometer 110 based on magnetometer measurements associated with the x sensing axis (such as a magnetic field along the x sensing axis), a magnetometer reading $m_y$ may be obtained from the magnetometer 110 based on magnetometer measurements associated with the y sensing axis (such as a magnetic field along the y sensing axis), and a magnetometer reading $m_z$ may be obtained from the magnetometer 110 based on magnetometer measurements associated with the z sensing axis (such as a magnetic field along the z sensing axis).

At 404, the orientation of the electronic device 201 is calculated. For example, the magnetometer reading(s) and accelerometer reading(s) can be used to calculate an orientation of the electronic device 201. By way of further example, the orientation calculation that is based on the accelerometer reading(s) and/or magnetometer reading(s) can be used as the reference point in connection with gyroscope reading(s) in order to calculate an orientation of the electronic device 201.

In accordance with an exemplary embodiment, the electronic device 201 stores the most recent magnetometer readings in respect of each magnetometer sensing axis Mx, My, Mz. When a magnetometer reading is obtained in respect of any of its three sensing axes it can be compared to the stored values of the most recent magnetometer readings. If there is no difference (or if the difference is below a predetermined threshold) between the magnetometer reading and the stored value in respect of an identified magnetometer sensing axis, then there is substantially no change in the orientation of the electronic device in respect of the identified magnetometer sensing axis. In such a situation the calculation of the orientation of the electronic device 102 does not take into account (i.e. does not use) the identified magnetometer sensing axis, and instead only updates the past orientation 299 (and in one or more embodiments the reference point) in respect of the magnetometer sensing axes that have indicated a change. In an alternative embodiment, the electronic device 201 does not separately store the most recent magnetometer readings in respect of each magnetometer sensing axis Mx, My, Mz and instead determines whether there has been no change in respect of an identified magnetometer sensing axis based only on the past orientation 299.

At 406, it is determined that for an amount of time at least as long as a predetermined amount of time a magnetometer reading from an identified sensing axis of the magnetometer 110 is not used to calculate the orientation of the electronic device 201. For example, the processor 240 could operate a timer that keeps track of the time since when the last reading of the magnetometer in respect of the x-axis (or of another axis) was used in the calculation of the orientation of the electronic device 201. If there was no change (or if the change was below a threshold) in the magnetic field in respect of the magnetometer's x-axis (or of another sensing axis) since a previous reading in respect of the magnetometer's x-axis (or other sensing axis), then the reading of the magnetic field in respect of the magnetometer's x-axis (or other sensing axis) indicates that the electronic device 201 did not move in respect of the magnetometer's x-axis (or other sensing axis). The timer can be used to measure the length of time that has passed since a magnetometer reading from an identified sensing axis of the magnetometer 110 was last used to calculate the orientation of the electronic device 201. This amount of time can be compared to the predetermined amount of time to determine if the amount of time that magnetometer reading from the identified sensing axis of the magnetometer has not been used in the calculation of the orientation of the electronic device 201 is at least as long as the predetermined amount of time.

At 408, detection of the magnetometer readings in respect of the identified sensing axis (e.g. the x-axis) is disabled. For example, during the time the magnetometer readings in respect of the identified sensing axis are disabled, few or no samples are obtained for the magnetometer in respect of the identified sensing axis.

At 410, the accelerometer readings are detected. For example, samples can be obtained for one or more of the accelerometer sensing axes. This may be performed on predetermined intervals. Magnetometer readings and gyroscope readings for sensing axes that are not disabled can also be obtained. The readings can be used to calculate the orientation of the electronic device 201, for example.

At 412, it is determined that the accelerometer readings indicate a movement above a threshold of the electronic device 201 in respect of the identified magnetometer sensing axis. For example, readings from one or more sensing axes of the accelerometer indicate corresponding movement in respect of the identified magnetometer sensing axis. For example, the identified magnetometer sensing axis may be the same as or identical to one of the accelerometer sensing axes. Alternatively, movement of the electronic device 201 about the identified magnetometer sensing axis can be approximated by one or more of the accelerometer sensing axes, depending on the orientation of the three orthogonal accelerometer sensing axes relative to the three orthogonal magnetometer axes. In one or more embodiments, the gyroscope readings can indicate movement above a threshold in respect of the identified magnetometer sensing axis.

At 414, the magnetometer readings in respect of the identified sensing axis are enabled. For example, the electronic device 201 may now obtain or receive samples from the magnetometer 110 in respect of the identified sensing axis.

In one or more alternative embodiments, the accelerometer readings can be detected at 402 and disabled (in respect of an identified accelerometer sensing axis) at 408 instead of the magnetometer.

The embodiments described are by way of example. Any number of axes on any number of sensors can be disabled if there are enough enabled axes on one or more sensors to detect the orientation of the electronic device 201. For example, the axis (or axes) can be disabled in order to save power used in the electronic device 201. By way of further example, the sensors that are enabled can be periodically rotated.

In one or more embodiments, the axis or orthogonal axes of the gyroscope 108 do not align with the axis or orthogonal axes of one or more other sensors associated with the electronic device 201. For example, the gyroscope 108 can have three orthogonal axes that do not align with the three orthogonal axes of the accelerometer 109 or the three orthogonal axes of the magnetometer 110. Following the same example, the sensing axes are such that the readings from the accelerometer 109 and magnetometer 110 can be used to measure the orientation of the electronic device 201 and in particular can be used to measure a change in rotation in respect of one or more of the sensing axes of the gyroscope 108.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable storage medium including program instructions recorded thereon (which may, for example, cause a processor to perform one or more of the methods described herein), or a computer data signal carrying computer readable program instructions may direct an apparatus to facilitate the practice of the described methods. It is understood that such apparatus, articles of manufacture, and computer data signals also come within the scope of the present disclosure.

The term "computer readable storage medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile/Video Disc (DVD) or Blu-ray™ Disc, and a solid state storage device (e.g., NAND flash or synchronous dynamic RAM (SDRAM)).

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

What is claimed is the following:

1. A method of controlling sensor use on an electronic device, the electronic device having a first sensor defining two or more first sensor axes, the method comprising:
   detecting a first sensor reading, the first sensor reading including a current sensor value for each of the two or more first sensor axes;
   for each of the two or more first sensor axes, comparing the current sensor value to at least one sensor value detected within a previous duration of time, the previous duration of time being a predetermined amount of time;
   identifying a first sensor axis in the two or more first sensor axes having a detected sensor value that has not changed during the previous duration of time; and
   disabling the detection of the first sensor reading associated with the identified first sensor axis having a detected sensor value that has not changed during the previous duration of time.

2. The method of claim 1, wherein the electronic device further comprises a second sensor defining two or more second sensor axes and a third sensor defining two or more third sensor axes, the method further comprising:
   detecting a second sensor reading and third sensor reading, the second sensor reading including a current sensor value for each of the two or more second sensor axes, the third sensor reading including a current sensor value for each of the two or more third sensor axes;
   determining that at least one of the detected second sensor reading and third sensor reading indicate movement of the electronic device associated with the previously identified first sensor axis above a predetermined threshold; and
   enabling the detection of the first sensor reading associated with the previously identified first sensor axis.

3. The method of claim 2 wherein the first sensor is a magnetometer, the second sensor is an accelerometer and the third sensor is a gyroscope, and when a magnetometer sensor value for an identified magnetometer axis has not changed during the previous duration of time, disabling detection of the magnetometer reading associated with the identified magnetometer axis.

4. The method of claim 3, further comprising, when detection of the magnetometer reading associated with the identified magnetometer axis is disabled, determining the orientation of the electronic device using one or more of the gyroscope readings and the accelerometer readings.

5. The method of claim 2 wherein the first sensor is a gyroscope, the second sensor is an accelerometer and the third sensor is a magnetometer.

6. The method of claim 5, wherein disabling the detection of first sensor data in respect of the identified first sensor axis comprises ceasing detection of the rotation of the electronic device by the gyroscope in respect of the identified gyroscope axis.

7. The method of claim 6, wherein the accelerometer data and the magnetometer data are used to calculate a measurement of the rotation about the identified gyroscope axis, the method further comprising enabling the detection of gyroscope data by the gyroscope in respect of the identified gyroscope axis if the measurement of the rotation is above a predetermined amount.

8. The method of claim 2 wherein the first sensor defines three orthogonal first sensor axes, wherein the second sensor defines three orthogonal sensor axes and wherein the third sensor defines three orthogonal sensor axes.

9. The method of claim 1, wherein the predetermined amount of time is in the range of 1 second to 2 seconds.

10. An electronic device comprising:
a memory;
a first sensor for detecting first sensor readings, the first sensor defining two or more first sensor axes; and,
a processor coupled to memory and the first sensor, the processor being configured to control sensor use on the electronic device by:
  detecting a first sensor reading, the first sensor reading including a current sensor value for each of the two or more first sensor axes;
  for each of the two or more first sensor axes, comparing the current sensor value to at least one sensor value detected within a previous duration of time, the previous duration of time being a predetermined amount of time;
  identifying a first sensor axis in the two or more first sensor axes having a detected sensor value that has not changed during the previous duration of time; and
  disabling the detection of the first sensor reading associated with the identified first sensor axis having a detected sensor value that has not changed during the previous duration of time.

11. The electronic device of claim 10 further comprising:
a second sensor defining two or more second sensor axes, the second sensor for detecting second sensor readings associated with the two or more second sensor axes; and,
a third sensor defining two or more third sensor axes, the third sensor for detecting third sensor readings associated with the two or more third sensor axes, wherein the processor is further configured to:
  detecting a second sensor reading and third sensor reading, the second sensor reading including a current sensor value for each of the two or more second sensor axes, the third sensor reading including a current sensor value for each of the two or more third sensor axes;
  determining that at least one of the detected second sensor reading and third sensor reading indicate movement of the electronic device associated with the previously identified first sensor axis above a predetermined threshold; and
  enabling the detection of the first sensor reading associated with the previously identified first sensor axis.

12. The electronic device of claim 11 wherein the first sensor is a magnetometer, the second sensor is an accelerometer and the third sensor is a gyroscope, and when a magnetometer sensor value for an identified magnetometer axis has not changed during the previous duration of time, disabling detection of the magnetometer reading associated with the identified magnetometer axis.

13. The electronic device of claim 12, wherein when detection of the magnetometer reading associated with the identified magnetometer axis is disabled, the processor is configured to determine the orientation of the electronic device using one or more of the gyroscope readings and the accelerometer readings.

14. The electronic device of claim 11, wherein the first sensor is a gyroscope, the second sensor is an accelerometer and the third sensor is a magnetometer.

15. The electronic device of claim 14, wherein disabling the detection of first sensor data in respect of the identified first sensor axis comprises ceasing detection of the rotation of the electronic device by the gyroscope in respect of the identified gyroscope axis.

16. The electronic device of claim 6, wherein the processor uses the accelerometer data and the magnetometer data is used to calculate a measurement of the rotation about the identified gyroscope axis, and wherein the processor is further configured to enable the detection of gyroscope data by the gyroscope in respect of the identified gyroscope axis if the measurement of the rotation is above a predetermined amount.

17. The electronic device of claim 11, wherein the first sensor defines three orthogonal first sensor axes, wherein the second sensor defines three orthogonal sensor axes and wherein the third sensor defines three orthogonal sensor axes.

18. The electronic device of claim 10, wherein the predetermined amount of time is in the range of 1 second to 2 seconds.

19. A non-transitory computer readable storage medium comprising computer-executable instructions for controlling sensor use on an electronic device by:
  detecting a first sensor reading, the first sensor reading including a current sensor value for each of two or more first sensor axes;
  for each of the two or more first sensor axes, comparing the current sensor value to at least one sensor value detected within a previous duration of time, the previous duration of time being a predetermined amount of time;
  identifying a first sensor axis in the two or more first sensor axes having a detected sensor value that has not changed during the previous duration of time; and
  disabling the detection of the first sensor reading associated with the identified first sensor axis having a detected sensor value that has not changed during the previous duration of time.

20. The non-transitory computer readable storage medium of claim 19, wherein the electronic device further comprises a second sensor defining two or more second sensor axes, the second sensor for detecting second sensor readings associated with the two or more second sensor axes, and wherein the electronic device further comprises a third sensor defining two or more third sensor axes, the third sensor for detecting third sensor readings associated with the two or more third sensor axes, the computer-executable instructions further configured to:
  detect a second sensor reading and third sensor reading, the second sensor reading including a current sensor value for each of the two or more second sensor axes, the third sensor reading including a current sensor value for each of the two or more third sensor axes;
  determine that at least one of the detected second sensor reading and third sensor reading indicate movement of the electronic device associated with the previously identified first sensor axis above a predetermined threshold; and
  enable the detection of the first sensor reading associated with the previously identified first sensor axis.

* * * * *